US006808728B2

(12) United States Patent
Hashisaka et al.

(10) Patent No.: US 6,808,728 B2
(45) Date of Patent: *Oct. 26, 2004

(54) METHOD FOR REDUCING COLOR MIGRATION IN MULTI-LAYERED AND COLORED GEL-BASED DESSERT PRODUCTS AND THE PRODUCTS SO PRODUCED

(75) Inventors: Ann E. A. Hashisaka, Anaheim, CA (US); Virender Sethi, Anaheim, CA (US); Amy Lammert, Monrovia, CA (US); Mario Mikula, Mission Viejo, CA (US)

(73) Assignee: ConAgra Grocery Products Company, Irvine, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 128 days.

This patent is subject to a terminal disclaimer.

(21) Appl. No.: 09/296,694

(22) Filed: Apr. 21, 1999

(65) Prior Publication Data

US 2001/0051199 A1 Dec. 13, 2001

(51) Int. Cl.$^7$ .......................... A23L 1/27; A23L 1/275; A23L 1/187
(52) U.S. Cl. ....................... 426/249; 426/578; 426/579; 426/399; 426/519; 426/522
(58) Field of Search ................................. 426/103, 589, 426/572–579, 249, 540, 399, 519, 522

(56) References Cited

U.S. PATENT DOCUMENTS

| | | | |
|---|---|---|---|
| 1,578,122 A | * | 3/1926 | Higgins |
| 2,484,543 A | * | 10/1949 | Baldwin et al. ............. 99/139 |
| 2,533,221 A | * | 12/1950 | Cleland et al. ............. 99/148 |
| 2,651,576 A | | 9/1953 | Longenecker et al. ........ 99/148 |
| 2,841,499 A | * | 7/1958 | Grossi ...................... 99/148 |
| 2,932,572 A | | 4/1960 | Sarich |
| 3,111,411 A | | 11/1963 | Livingston .................. 99/148 |
| 3,249,444 A | | 5/1966 | Bollenback et al. .......... 99/148 |
| 3,336,141 A | * | 8/1967 | Frisina ...................... 99/148 |
| 3,552,980 A | * | 1/1971 | Cooper |
| 3,579,355 A | | 5/1971 | Wyss et al. ................. 99/130 |
| 3,582,358 A | | 6/1971 | Bundus ...................... 99/128 |
| 3,615,591 A | | 10/1971 | Newlin et al. ................ 99/128 |
| 3,615,592 A | | 10/1971 | Peterson .................... 99/134 |
| 3,618,588 A | * | 11/1971 | Anwar ...................... 99/148 |
| 3,734,745 A | | 5/1973 | Cassanelli et al. |
| 3,860,728 A | | 1/1975 | Tanner et al. ............... 426/105 |
| 3,924,016 A | | 12/1975 | Walters et al. .............. 426/540 |
| 3,937,851 A | | 2/1976 | Bellanca et al. |
| 3,969,514 A | | 7/1976 | Tiemstra ..................... 426/90 |
| 3,969,536 A | | 7/1976 | Ikeda et al. |
| 4,113,505 A | | 9/1978 | Bellanca et al. |
| 4,138,271 A | | 2/1979 | Ohira et al. .................. 127/34 |
| 4,167,422 A | | 9/1979 | Bellanca et al. |
| 4,304,792 A | * | 12/1981 | Sreenivasan et al. ......... 426/250 |
| 4,325,743 A | * | 4/1982 | Tibbetts et al. ............. 127/46.2 |
| 4,414,234 A | * | 11/1983 | Sreenivasan et al. ......... 426/540 |
| 4,560,564 A | | 12/1985 | Bruno, Jr. et al. ............ 426/548 |
| 4,568,553 A | | 2/1986 | Murray et al. ............... 426/548 |
| 4,614,662 A | | 9/1986 | Ramaswamy ................ 426/540 |
| 4,717,571 A | * | 1/1988 | Okonogi et al. .............. 426/104 |
| 4,744,991 A | | 5/1988 | Serpelloni ...................... 426/5 |
| 4,753,766 A | | 6/1988 | Pinsolle |
| 4,758,444 A | | 7/1988 | Terauchi et al. .............. 426/593 |
| 4,759,936 A | * | 7/1988 | Best et al. .................... 426/250 |
| 4,869,917 A | | 9/1989 | Cunningham et al. ......... 426/576 |
| 4,906,489 A | * | 3/1990 | Flango, Jr. et al. |
| 4,915,971 A | | 4/1990 | Fennema et al. ............. 426/578 |
| 5,019,405 A | | 5/1991 | Sapers ........................ 426/250 |
| 5,114,492 A | | 5/1992 | Wolf et al. ..................... 127/42 |
| 5,151,293 A | | 9/1992 | Vassiliou ..................... 426/614 |
| 5,192,566 A | | 3/1993 | Cox et al. ..................... 428/89 |
| 5,202,137 A | | 4/1993 | Duffy et al. ................... 426/89 |
| 5,227,189 A | | 7/1993 | Vassiliou ..................... 426/614 |
| 5,338,554 A | | 8/1994 | Vogt et al. ..................... 426/45 |
| 5,387,427 A | | 2/1995 | Lawrence et al. ............ 426/573 |
| 5,417,990 A | | 5/1995 | Soedjak et al. |
| 5,633,031 A | | 5/1997 | Zablocki et al. ............. 426/590 |
| 6,235,320 B1 | * | 5/2001 | Daravingas et al. |
| 6,294,213 B1 | | 9/2001 | Hashisaka et al. ........... 426/249 |

FOREIGN PATENT DOCUMENTS

EP        686 354        9/1999

OTHER PUBLICATIONS

Tressler et al, Food Products Formulary, vol. 2, "Cereals, Baked Goods, Dairy and Egg Products" pp. 162–164 (1975).*

(List continued on next page.)

*Primary Examiner*—Nina Bhat
(74) *Attorney, Agent, or Firm*—Bingham McCutchen, LLP

(57) ABSTRACT

Disclosed is a multi-layered, dessert product, such as a pudding product, made from a gel having a continuous aqueous phase and a dispersed colloidal oil phase. The dessert product has at least one layer that contains a natural, oil soluble colorant, preferably dispersed in the oil phase. The products are formed of a layer containing a first colorant and an adjacent layer containing a second, different colorant. The multi-layered gel-based dessert products are made by introducing a gel-based dessert product containing the first colorant into the bottom of a transparent container to form a first layer and then introducing additional gel-based product containing the second colorant into the container to form a second layer on top to the first. The resulting multi-layer product exhibits reduced color migration between the two layers.

30 Claims, No Drawings

OTHER PUBLICATIONS

D.D. Williamson, The Basics of Caramel Colors, Apr. 17, 1999; pp. 1–9.
D.D. Williamson, Caramel Color, A Love Story; pp 1–20.
Kuntz, Lynn A., Editor, Food Product Design, Mar. 1998; Applications: Colors Au Naturel; pp. 60–74.
Food Technology; Products & Technologies—Ingredients; Jun. 1998, vol. 52, No. 6, pp. 70–82.
Warner-Jenkinson, Brochure: What is Beta Carotene!; pp. 1–3.
Food Product Design, Acid–Stable Natural Colors Offer Opportunities for Formulations, Jun. 1998, p. 145.

* cited by examiner

METHOD FOR REDUCING COLOR MIGRATION IN MULTI-LAYERED AND COLORED GEL-BASED DESSERT PRODUCTS AND THE PRODUCTS SO PRODUCED

BACKGROUND OF THE INVENTION

1. Field of the Invention

This invention relates to the food-making arts. In particular, it relates to a method for making gel-based dessert products, such as puddings, and the products so produced.

2. Discussion of the Related Art

Consumers regularly eat pudding and other gel-based dessert products, some of which are non-dairy based. Consumers' desire for convenient foods led to the development of such items that require little or no advance preparation by the consumer before eating. Beginning approximately 30 years ago, consumers were offered these types of products in ready-to-eat, single-serve, portable containers. Initially these products were sold as shelf-stable, canned products. These canned products, such as pudding, were subjected to retort processing and did not as closely approximate home-made pudding as did the later developed aseptically packaged puddings.

As consumers begin to have more choices with regard to wholesome, nutritious snacks, manufacturers have developed new markets and innovated to remain competitive in this area. A new market for milk-based pudding and other dessert gels is the entry into the refrigerated section of the supermarket. One of the innovations has been the packaging changeover from opaque plastic to clear plastic cups, allowing the consumer to see that which is being purchased. Industry's move to clear plastic cups has engendered other innovations, such as the layering of different flavor puddings or other gelled desserts into the same cup or container. These improvements also are being used with shelf-stable puddings and other gel-based desserts that are stored at room temperature for long periods of time.

The color of a food or beverage is one of the first attributes recognized by the senses of the purchaser and intended consumer of the product. Typically, when a manufacturer makes pudding, or other dessert product which has more than one flavor layer, the manufacturer colors the layers differently to make the product more attractive and commercially appealing. Current manufacturing methods have concentrated on using oil or water dispersed lake colorants to produce the desired colors. For example, manufacturers have tried to produce pudding products having a top layer that is red, yellow, or brown color in color next to a bottom layer that is a contrasting color, such as yellow or white. Specific examples include multi-layer pudding products with a bottom layer of banana-yellow with a top layer of cream-white or a bottom layer of apple-yellow and a top layer of golden caramel color.

Color migration can be defined as the mobility of a colorant in a pudding formulation into an adjacent layer of pudding, that it was not intended to be in, that results in the lightening or darkening otherwise distorting of the adjacent layer(s) during the shelf life of the pudding product. In a single flavor/color pudding cup, the migration of color has not been an issue. However, in a multi-layered pudding cup, the migration of the color changes the appearance of the product from what it was intended to be, which results in the product not appearing as it was originally designed to appear to the consumers, and thus has a decreased consumer acceptance. For example, when the bottom layer is a darker color and the top layer is a lighter color, the darker color migrates from the bottom layer up into the upper lighter layer causing it to darken, the lighter color migrates down into the bottom layer causing it to lighten, or both.

For coloring flavor layers outside the caramel color range (e.g., from light yellow to dark brown) colorants typically have been provided by way of alumina-based oil-dispersable lakes comprised of a mix of FD&C dyes (e.g., a combination of Red No. 40 and Blue No. 1). The resulting monochromatic single layer appears to be of uniform coloration. These FD&C lakes are insoluble in oil and water. These traditional oil-dispersable lakes comprised of a mix of FD&C dyes do not work very well with a multi-layer, multi-color pudding, or with other gel-based desserts. The colors tend to migrate, thus bleeding color from one layer to another, therefore they appear undesirable to the consumer.

There has existed a definite need for a method for preparing multi-layered, gel-based dessert products having at least one layer that contains a natural oil soluble color, that exhibits reduced migration into the adjacent layer(s). This present invention satisfies these and other needs.

SUMMARY OF THE INVENTION

Now in accordance with the invention, there has been found a method for reducing color migration in multi-layered, dessert products from gels having a continuous aqueous phase and a dispersed colloidal oil phase. The dessert products have at least one layer that contains a natural, oil soluble colorant. In preferred embodiments, the natural oil soluble colorant is dispersed in the oil phase.

The products are formed of a layer containing a first colorant and an adjacent layer containing a second, different colorant. Representative products include pudding products, yogurt products, and non-milk gel-based dessert products. Representative natural, oil soluble colors include beta-carotene, annatto, paprika oleoresin, or lycopene, either alone or in combination. In some embodiments, the layer that contains the natural oil soluble colorant also contains a caramel colorant, preferably a negatively charged caramel colorant having a weight average molecular weight of between about 200,000 Daltons and 650,000 Daltons, present in an amount between about 0.02% and about 0.08% by weight.

The multi-layered gel-based dessert products are made by introducing a gel-based dessert product containing the first colorant into the bottom of a transparent container to form a first layer and then introducing additional gel-based product containing the second colorant into the container to form a second layer on top to the first. The resulting multi-layer product exhibits reduced color migration between the two layers.

DETAILED DESCRIPTION OF THE PREFERRED EMBODIMENTS

To exemplify the product and process in accordance with the invention, the following description concentrates primarily of a multi-layered pudding product and a method for making the multi-layered product. It should be readily apparent to the skilled artisan that the description with little modification, might also apply to the preparation of other gel-based dessert products including both other milk-based gel products, such as yogurt, as well as their non-dairy counterparts. The multi-layered, gel-based dessert product of this invention has a continuous aqueous phase and a dispersed colloidal oil phase.

The pudding made in accordance with this invention has at least two adjacent layers. Each pudding layer is prepared from conventional pudding ingredients, typically including nonfat milk, water, a sweetener, an emulsified fat and/or oil, a thickener, particularly a starch thickener, and at least on emulsifier/stabilizer. Additional ingredients include non-fat milk solids, pieces of fruit, salt, colorants, and flavorants. A typical pudding formulation is given in the table below. Certain ingredients may not be present in certain types of pudding such as the intentional absence of fat or oil in "fat free" pudding. Similarly, not all gel desserts (i.e., "non-dairy") need contain milk products.

| Ingredient | Acceptable Range (% weight) | Preferred Range (% weight) |
| --- | --- | --- |
| Nonfat Milk | 30.0–70 | 35.0–45 |
| Water | 5.00–20 | 10.0–15 |
| Sweetener | 0.05–30 | 0.50–25 |
| Fat | 0.50–15 | 0.50–10 |
| Thickener | 2.00–10 | 3.00–8.0 |
| Salt | 0.05–2.0 | 0.75–1.25 |
| Emulsifier/Stabilizer | 0.01–2.0 | 0.05–1.50 |
| Colors | 0.01–2.0 | 0.02–1.25 |
| Flavors | 0.05–2.0 | 0.10–1.50 |

The pudding layers are typically made with from about 30 to about 70 wt. %, preferably from about 35 to about 45 wt. % skim milk and/or non-fat milk and from about 5 to about 20 wt. %, preferably from about 10 to about 15 wt. % water. For those puddings which contain a low level of fat, low-fat or whole milk may also be used as ingredients. Throughout this specification and the claims, all weight percentages are based on the total weight of the ingredients used to make the pudding layer.

The sweetener component employed in formulating the pudding layers of the present invention is chosen to provide a desired degree of sweetness and solids to the final pudding product. Sucrose is the preferred sweetener component. Generally, sucrose is used in an amount from about 0.05 to about 30 wt. %, preferably from about 0.5 to about 25 wt. %. Other suitable sweeteners that can be employed as all or a portion of the sweetener component include other sweet mono-, di- or polysaccharides, such as dextrose, fructose, corn syrups, corn syrup solids, high fructose corn syrups, and the like. Nutritive and non-nutritive, intensive sweeteners such as saccharin, aspartame, Sucralose™, Acesulfame K™ and the like may also be employed as all or part of the sweetener component. The use of intensive sweeteners may be accompanied by use of suitable sweet or non-sweet bulking agents to provide a desired solids level; however, bulking agents will typically not be needed. All of theses components are to be included in the term "sweetener" as employed in this invention; provided, however, that in the case of syrups, only the solids portion is included as a sweetener.

Any suitable thickening agent can be employed to provide the desired firmness or texture. In preferred embodiments, the thickening agent is a starch, including corn starch, potato starch, tapioca starch, rye flour, wheat flour, and the like, modified or unmodified. In most preferred embodiments the thickening agent is a combination of modified corn and modified waxy corn starches. Typically, the starch is present in an amount from about 2 to about 10 wt. %, preferably from about 3 to about 8 wt. %.

Fat emulsions are usually incorporated in the pudding composition to improve the textual quality and mouthfeel of the pudding. The fat emulsion usually contains a vegetable fat, such as a partially hydrolyzed vegetable oil, in an amount from about 0.5 to about 15 wt. %, preferably from about 0.5 to about 10 wt. %.

The pudding composition of the present invention also contains at least emulsifier/stabilizer component which aids in dispersing and mixing of ingredients and contributes to the desired firm, smooth texture. A preferred emulsifier/stabilizer is sodium stearoyl-2-lactylate. Other suitable emulsifier/stabilizer ingredients include mixtures of mono- and di-glycerides prepared by direct esterfication of edible fatty acids and glycerine, propylene glycol esters of fatty acids, and lecithin. Protein stabilizers, such as disodium phosphate are also useful in accordance with the invention. The emulsifier/stabilizer(s) is generally present in an amount from about 0.01 to about 2 wt. %, preferably from about 0.05 to about 1.5 wt. %.

When selecting a color, natural oil soluble colors may be dispersed in the oil phase, and preferably be homogenized. One example is to use annatto to give the appearance of "banana-yellow" and to use beta-carotene to give a "lemon-yellow" color to one of the layers.

Any natural oil soluble food color may be used in accordance with this invention. Representative colors include beta-carotene, annatto, paprika oleoresin, and lycopene. These natural oil soluble colorants can be dispersed in the colloidal oil phase of the pudding or gel-based dessert. Because the hydrophobic oil does not migrate within the continuous aqueous phase, these oil soluble colorants become entrapped in the oil matrix and do not disperse throughout the aqueous phase, therefore they do not migrate from one layer to another.

In some embodiments, it is possible to create a color that is darker than annatto, beta-carotene, or other natural oil soluble colors, yet is lighter than the lightest caramel color available. This is accomplished by including a natural oil soluble color in the oil phase and then a percentage of caramel colorant that, preferably is negatively charged, and more preferably has a weight average molecular weight of between about 200,000 Daltons and 650,000 Daltons, to tint the oil phase. The use of caramel colorants in multi-layer gel-based dessert products is described in a co-pending application, entitled Method For Reducing Color Migration In Multi-Layered, Caramel Colored, Gel-Based Dessert Products and the Products So Produced, filed concurrently herewith, bearing Ser. No. 09/296,706, and said application is incorporated herein by reference. To tint the oil phase mixture, use from about 0.02% to about 0.08% caramel color by weight. Doing so will yield colors such as "tan" and yellows with more "warmth" than the light-yellow "banana" color or the bright-yellow "lemon" color that one obtains from simply using annatto or beta-carotene, respectively.

The formulation used for both pudding layers can also contain conventional pudding ingredients such as salt, typically in an amount from about 0.05 to about 2 wt. %, preferably from about 0.75 to about 1.25 wt. %, and flavorants, as for example vanilla, strawberry, cocoa, caramel, and the like. The flavorants can be used in the pudding composition at any desired concentration depending upon the particular flavoring desired. Typically, the flavorants are present in an amount from about 0.05 to about 2 wt. %, preferably from about 0.1 to about 1.5 wt. %. Other ingredients that can be included in one or both of the pudding layers include non-fat milk solids and pieces of fruit.

According to one method for preparing the multi-layer pudding in accordance with the invention, a bottom pudding the layer is prepared first by combining the liquid ingredients, including a portion of the water having a temperature of between about 150° F. and about 180° F., preferably about 170° F.; with from about 30 to about 70 wt. %, preferably from about 35 to about 45 wt. % heated skim milk and/or non-fat milk; from about 0.5 to about 15 wt. %, preferably from about 0.5 to about 10 wt. %. vegetable oil; and from about 0.01 to about 2 wt. %, preferably from about 0.05 to about 1.5 wt. %. emulsifier/stabilizer(s). If the bottom layer is to contain a natural oil soluble colorant, from about 0.01 to about 2 wt. %, preferably from about 0.02 to about 1.25 wt. % colorant can be added at this time. Alternatively, the natural oil soluble colorant can be added at any time during the process, up until the ingredients are cooked and the gel is formed. If the bottom layer is to contain a colorant other than a natural oil soluble colorant or in addition to the natural oil soluble colorant, it can be combined with the other liquid ingredients or added subsequently. Under these conditions, natural oil soluble colors become approximately evenly dispersed in the oil phase.

In one preferred embodiment, a natural oil soluble color is combined with a low-percentage tinting amount of a caramel color, that, preferably is negatively charged, and more preferably has a weight average molecular weight of between about 200,000 Daltons and 650,000 Daltons, and may be used to produce a different non-migrating color than either of the component colors would produce alone.

The liquid ingredients are then mixed to effect thorough and complete dispersion, such as by homogenization. Typically, the liquid ingredients are charged into a single or multiple-stage homogenizers at an elevated temperature. The mixture is then passed through the homogenizer at a sufficient temperature and pressure to form a homogenized base.

To the homogenized base are added the remaining ingredients including from about 2 to about 10 wt. %, preferably from about 3 to about 8 wt. %. starch, added as a slurry using the remaining portion of water (the total amount of water added in both portions is from about 5 to about 20 wt. %, preferably from about 10 to about 15 wt. %); and other dry ingredients, such as salt in an amount from about 0.05 to about 2 wt. %, preferably from about 0.75 to about 1.25 wt. %, and flavorants, in an amount from about 0.05 to about 2 wt. %, preferably from about 0.1 to about 1.5 wt. %. If the colorants were not incorporated into the homogenized base, they can be added at this time.

These remaining ingredients are added to the homogenized base using a relatively high level of agitation. An induction mixer is one type of device for providing the desired agitation. After thorough mixing, the mixture is thermally processed, for example in a tube or a scraped-surface heat exchange apparatus so as to best accommodate the increasing viscosity of the mixture during heating. The pudding mixture then is heated to a sufficient temperature for the necessary time required to effect cooking and microbial kill.

In commercial operations it may be desirable to provide a hold tank between the mixing step and the cooking step in order to serve as a buffer against process disruptions. If such a tank is present, the tank should keep the pudding temperature at about 40° F. to retard microbiological growth.

The resulting pudding is cooled to a temperature suitable for filling into a transparent container, such as a transparent plastic cup. Cooling may be effected using either direct or indirect heat with a scraped-surface heat exchanger being typical for indirect heating and steam injection being a typical procedure for applying direct heat. The cooling step should be done while the mix is being subjected to shear conditions. Cooling may be accomplished using plate, tubular and/or scraped-surface heat exchangers. The cooled pudding is then introduced into the cup to form the first layer at a temperature below 140° F., preferably about 90° F.

A similar process is used to prepare a second pudding layer having a different color. After cooling to a suitable temperature for filling, the second pudding is introduced into the transparent plastic cup to form a second layer on top of the first. The process can be repeated as many times as desired to form three or more different layers. The third layer, for example, can be made from a third pudding formulation or it can be made from the material used to form the bottom layer. In some embodiments, of this invention the pudding has two adjacent layers, each with a natural oil soluble colorant, and in other embodiments, one or more of the layers may contain a negatively charged caramel colorant.

After the transparent cup is filled it is sealed, for example, with an adhesively applied foil lid. If an aseptic-packaging process is to be implemented, the process will further include steps of sterilizing the containers and lids into which the sterilized pudding is packaged and then filling the container with pudding in a sterile environment. Such known methods as superheated steam, hydrogen peroxide, ultraviolet light, high-intensity light, etc., are useful for sterilizing the packaging materials, i.e., the transparent container and foil lid. These steps would also be desirable to reduce microbial activity even in the event that a true aseptic process is not being sought, such as when the pudding is placed in a refrigerated distribution system and sterility is not required but extended storage life is desirable.

While the invention has been described in detail with reference to certain preferred embodiments thereof, it will be understood that modifications and variations are within the spirit and scope of that which is described and claimed.

We claim:

1. A method for preparing a multi-layer gel-based food product comprising:
    combining a source of fat, water, an oil soluble colorant, and an emulsifier to form a first mixture;
    homogenizing the first mixture to form a homogenized base having a dispersed oil phase, wherein the oil soluble color is present in the dispersed oil phase;
    adding a thickening agent to the homogenized based and mixing the resulting product to form a first gel-based mixture having a first color;
    introducing the first gel-based mixture into a container;
    introducing into the container a second gel-based mixture having a second color different from the first color, wherein the second gel-based mixture is adjacent to the first gel-based mixture.

2. The method of claim 1, further comprising adding milk to the first mixture prior to homogenizing.

3. The method of claim 1, further comprising adding milk to the homogenized base.

4. The method of claim 1, further comprising adding a sweetener to the homogenized base.

5. The method of claim 1, further comprising adding a flavorant to the homogenized base.

6. The method of claim 1, wherein the oil soluble colorant is a natural oil soluble colorant.

7. The method of claim 1, wherein the oil soluble colorant is selected from the group consisting of beta-carotene, annatto, paprika oleoresin, and lycopene.

8. The method of claim 1, wherein the first gel-based mixture further comprises a caramel color.

9. The method of claim 8, wherein the caramel color is negatively charged.

10. The method of claim 8, wherein the caramel color has a weight average molecular weight ranging from about 200,000 Daltons to about 650,000 Daltons.

11. The method of claim 1, wherein the second gel-based mixture contains milk.

12. The method of claim 1, wherein the second gel-based mixture contains a dispersed oil phase containing an oil soluble colorant.

13. The method of claim 1, further comprising:

combining a source of fat, water, an oil soluble colorant, and an emulsifier to form a second mixture;

homogenizing the second mixture to form a second homogenized base having a dispersed oil phase, wherein the oil soluble color is present in the dispersed oil phase;

adding a thickening agent to the homogenized based and mixing the resulting product to form the second gel-based mixture.

14. The method of claim 1, wherein the first gel-based mixture is introduced on top of the second gel-based mixture in the container.

15. The method of claim 1, wherein the second gel-based mixture is introduced on top of the first gel-based mixture in the container.

16. The method of claim 1, further comprising heating the first gel-based mixture at a temperature sufficient to effect microbial kill.

17. The method of claim 16, further comprising cooling the first gel-based mixture to a temperature at or below about 140° F. prior to introducing the first gel-based mixture into the container.

18. A method for preparing a multi-layer gel-based food product comprising:

combining a source of fat, water, an oil soluble colorant, and an emulsifier to form a first mixture;

homogenizing the first mixture to form a homogenized base having a dispersed oil phase, wherein the oil soluble color is present in the dispersed oil phase;

adding a thickening agent, a sweetener and a flavorant to the homogenized based and mixing the resulting product to form a first gel-based mixture having a first color;

combining a source of fat, water, an oil soluble colorant, and an emulsifier to form a second mixture;

homogenizing the second mixture to form a second homogenized base having a dispersed oil phase, wherein the oil soluble color is present in the dispersed oil phase;

adding a thickening agent, a sweetener and a flavorant to the second homogenized based and mixing the resulting product to form a second gel-based mixture having a second color different from the first color;

introducing the first and second gel-based mixtures into a container such that one of the first and second gel-based mixtures is on top of the other gel-based mixture.

19. The method of claim 18, further comprising heating the first gel-based mixture at a temperature sufficient to effect microbial kill.

20. The method of claim 19, further comprising cooling the first gel-based mixture to a temperature at or below about 140° F. prior to introducing the first gel-based mixture into the container.

21. The method of claim 18, further comprising introducing a third gel-based mixture into a container such that the third gel-based mixture is adjacent at least one of the first and second gel-based mixtures, wherein the third gel-based mixture has a color different from at least one of the first and second colors.

22. A method for preparing a multi-layer gel-based food product comprising:

combining a source of fat, water, an oil soluble colorant, and an emulsifier to form a first mixture;

homogenizing the first mixture to form a homogenized base having a dispersed oil phase, wherein the oil soluble color is present in the dispersed oil phase;

adding a thickening agent comprising starch to the homogenized based and mixing the resulting product to form a first thickened mixture having a first color;

introducing the first thickened mixture into a container;

introducing into the container a second thickened mixture having a second color different from the first color, wherein the second thickened mixture is adjacent to the first thickened mixture.

23. The method of claim 22, further comprising adding milk to the first mixture prior to homogenizing.

24. The method of claim 22, further comprising adding milk to the homogenized base.

25. The method of claim 22, wherein the oil soluble colorant is selected from the group consisting of beta-carotene, annatto, paprika oleoresin, and lycopene.

26. The method of claim 22, wherein the first thickened mixture further comprises a caramel color.

27. The method of claim 22, wherein the second thickened mixture contains milk.

28. The method of claim 22, wherein the second thickened mixture contains a dispersed oil phase containing an oil soluble colorant.

29. The method of claim 22, further comprising:

combining a source of fat, water, an oil soluble colorant and an emulsifier to form a second mixture;

homogenizing the second mixture to form a second homogenized base having a dispersed oil phase, wherein the oil soluble color is present in the dispersed oil phase;

adding a thickening agent to the homogenized based and mixing the resulting product to form the second thickened mixture.

30. The method of claim 22, wherein the first thickened mixture is introduced on top of the second thickened mixture in the container.

* * * * *

UNITED STATES PATENT AND TRADEMARK OFFICE
CERTIFICATE OF CORRECTION

PATENT NO.    : 6,808,728 B2
DATED         : October 26, 2004
INVENTOR(S)   : Ann A. E. Hashisaka et al.

It is certified that error appears in the above-identified patent and that said Letters Patent is hereby corrected as shown below:

Column 6,
Line 47, delete "based" and insert -- base --.

Column 7,
Lines 20, 45 and 55, delete "based" and insert -- base --.

Column 8,
Lines 22 and 53, delete "based" and insert -- base --.

Signed and Sealed this

Eleventh Day of January, 2005

JON W. DUDAS
*Director of the United States Patent and Trademark Office*